(12) United States Patent
Huang (10) Patent No.: US 12,468,153 B2
(45) Date of Patent: Nov. 11, 2025

(54) NEAR-EYE DISPLAY DEVICE, AUGMENTED REALITY DEVICE, AND VIEWING ANGLE ADJUSTMENT METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jian-Rong Huang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 321 days.

(21) Appl. No.: 18/240,148

(22) Filed: Aug. 30, 2023

(65) Prior Publication Data

US 2023/0408815 A1 Dec. 21, 2023

(30) Foreign Application Priority Data

Dec. 1, 2022 (CN) .......................... 202211531969.2

(51) Int. Cl.
*G02B 27/01* (2006.01)
*G02B 27/00* (2006.01)

(52) U.S. Cl.
CPC ..... *G02B 27/0149* (2013.01); *G02B 27/0093* (2013.01); *G02B 27/0101* (2013.01); *G02B 2027/0154* (2013.01)

(58) Field of Classification Search
CPC ............ G02B 27/0149; G02B 27/0093; G02B 27/0101; G02B 2027/0154; G02B 2027/0138; G02B 27/0172; G02B 2027/0187

See application file for complete search history.

(56) References Cited

U.S. PATENT DOCUMENTS 11,966,061 B2 * 4/2024 Porter ................ G02B 27/0172
2012/0306725 A1 12/2012 Hilkes

FOREIGN PATENT DOCUMENTS

| CN | 105827960 | | 8/2016 |
| CN | 109756663 | | 5/2019 |
| WO | 2011058707 | A1 | 5/2011 |
| WO | 2022005854 | A1 | 1/2022 |

* cited by examiner

*Primary Examiner* — Tuyen Tra
(74) *Attorney, Agent, or Firm* — ScienBiziP, P.C.

(57) ABSTRACT

A near-eye display device includes a camera module, a display module and a rotating module. The camera module is configured for obtaining an image information along a direction of a first optical axis. The display module is configured for transmitting an image light of virtual information to a human eye along a second optical axis. The rotating module is configured for controlling the rotation of the camera module to change a position of the first optical axis, so as to switch the near-eye display device between a state of close-up view and a state of distant view. In the state of distant view, an angle between the first optical axis and the second optical axis is 25°. In the state of close-up view, the angle between the first optical axis and the second optical axis is less than or equal to 13°.

20 Claims, 9 Drawing Sheets

NEAR-EYE DISPLAY DEVICE, AUGMENTED REALITY DEVICE, AND VIEWING ANGLE ADJUSTMENT METHOD

FIELD

The subject matter herein generally relates to displays, specifically to near-eye display devices, augmented reality devices, and viewing angle adjustment methods of the near-eye display devices.

BACKGROUND

Augmented reality (AR) is a kind of display technology that integrates virtual information with the real world. Existing AR display devices usually include a camera module and a display module, the camera module is used to obtain images within a visual field of a user and the display module is used to project virtual image to a preset position within the visual field of the user according to the images obtained by the camera module.

However, existing camera modules and display modules may only be well applied to a state of distant view, when the observed object is in a close-up view distance (for example, the distance between the observed object and the human eye is less than 40 cm), the vertical viewing angle of the human eye will move down automatically. At this time, the focus of the human eye may move away from the center of the real scene acquired by the camera module.

In addition, because a certain distance exists between the camera module and the display module, the optical axis of the camera module and the optical axis of the display module are usually intersecting to have a certain included angle to match the display in the state of distant view, causing that the overlapping area between a shooting range of the camera module and a display range of the display module becomes smaller in the state of close-range view, and thus the AR effect may not be achieved.

Therefore, there is room for improvement in the art.

BRIEF DESCRIPTION OF THE DRAWINGS

Implementations of the present disclosure will now be described, by way of embodiment, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

"Optional" or "optionally" means that the subsequently described circumstance may or may not occur, so that the description includes instances where the circumstance occurs and instances where it does not.

"Above" means one layer is located on top of another layer. In one example, it means one layer is situated directly on top of another layer. In another example, it means one layer is situated over the second layer with more layers or spacers in between.

When a feature or element is herein referred to as being "on" another feature or element, it can be directly on the other feature or element or intervening features and/or elements may also be present. It will also be understood that, when a feature or element is referred to as being "connected" or "attached" to another feature or element, it can be directly connected or attached to the other feature or element or intervening features or elements may be present.

Figure 1:
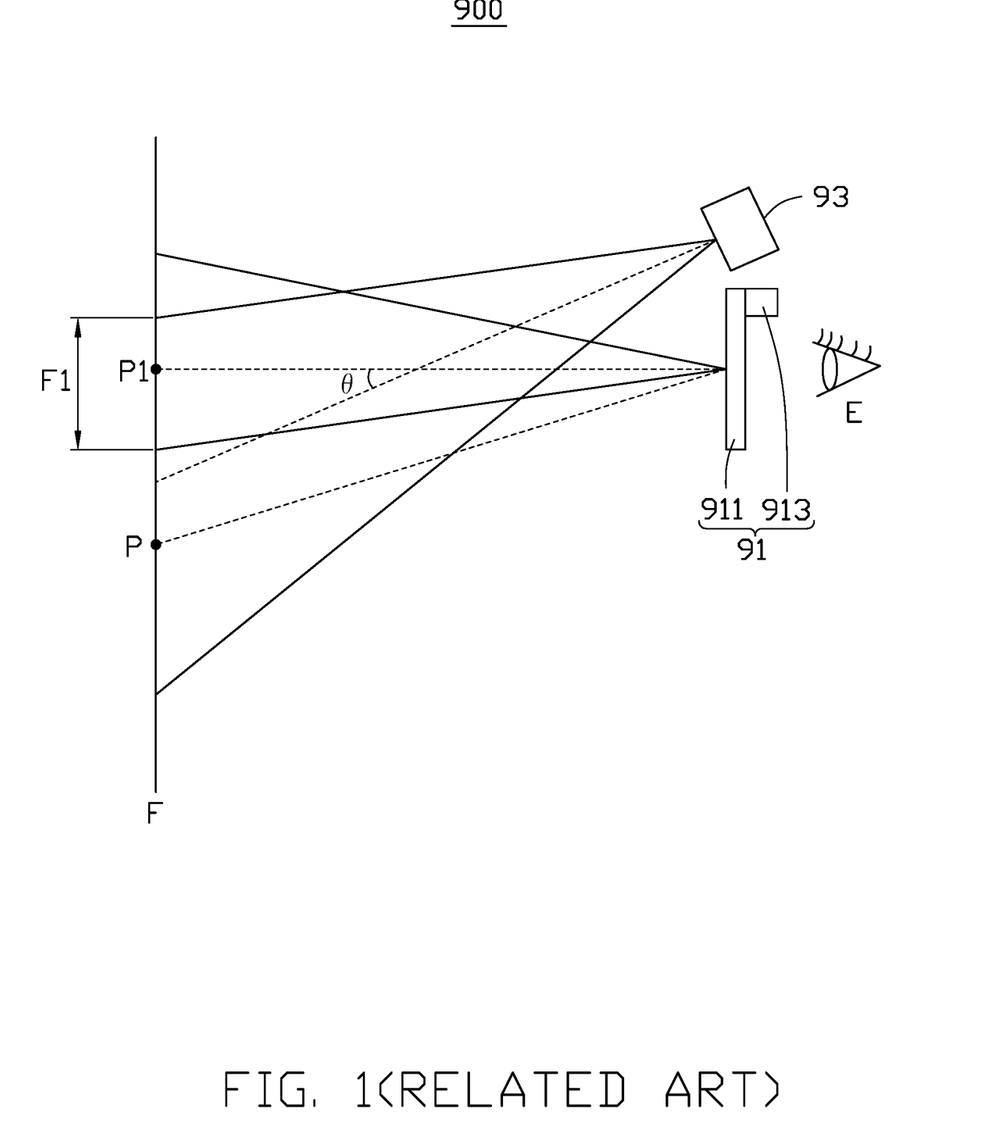
FIG. 1 is a side view of a near-eye display device in a state of close-up view in the related art.

FIG. 1 illustrates a near-eye display device 900 in the related art. The near-eye display device 900 includes a display module 91 and a camera module 93, the display module 91 includes a light transmitting waveguide plate 911 and a light engine 913. The near-eye display device 900 is a display device based on AR. The waveguide plate 911 is set in a direction of a human eye E looking at, and the light engine 913 is used to irradiate image light on the waveguide plate 911, so that the waveguide plate 911 can display the image light emitted by the light engine 913 to the user, while transmitting light from a side away from the human eye E simultaneously. As a result, the human eye E can see information of the real world and virtual information projected by the light engine 913, that is, AR display.

Figure 2:
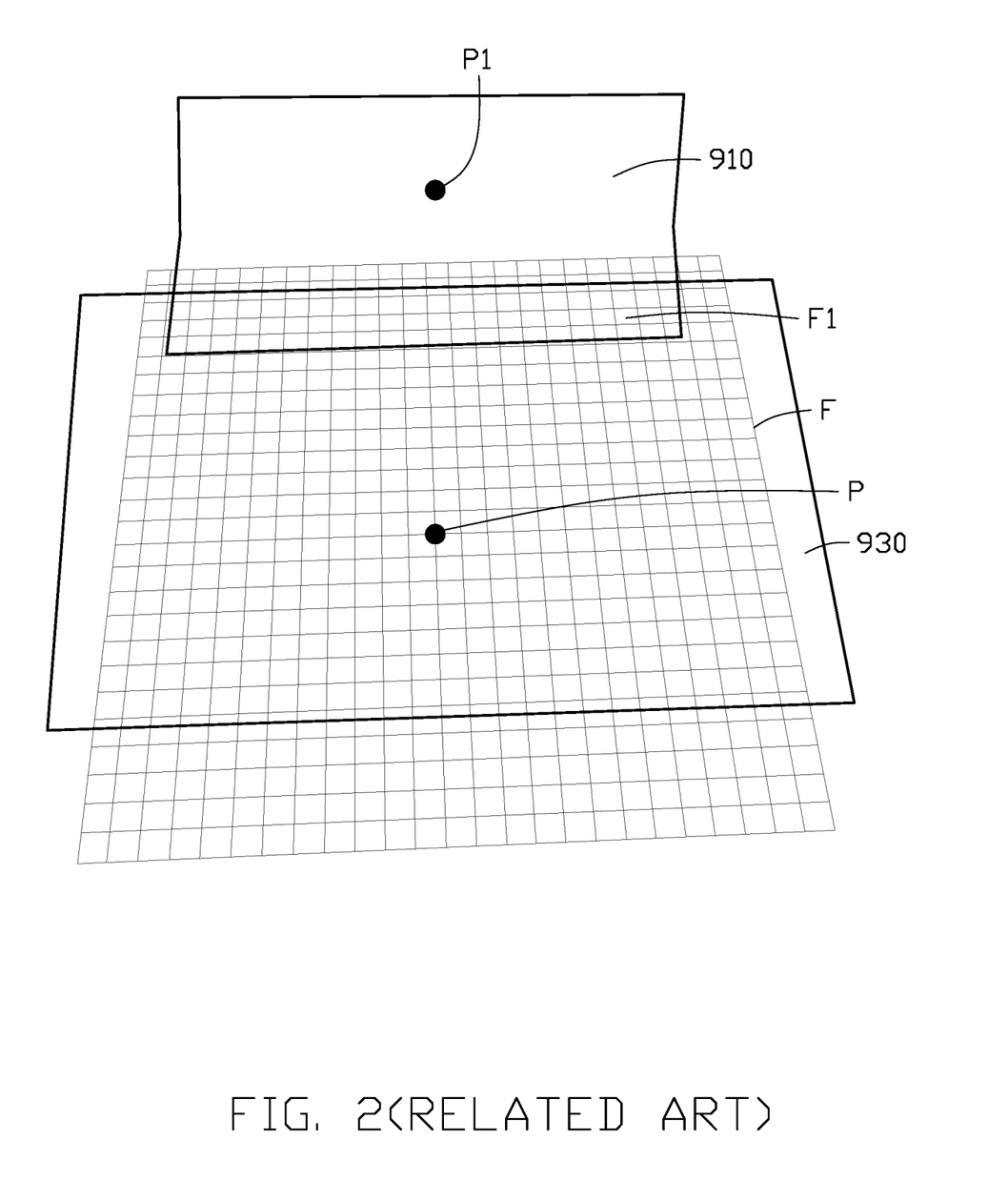
FIG. 2 shows a shooting range of a camera module and a display range of a display module of the near-eye display device in a state of close-up view in the related art.

The waveguide plate 911 is usually based on the principle of grating and total reflection, that is, the image light emitted by the light engine 913 is transmitted on the waveguide plate 911, and is continuously total reflected along both sides of the waveguide plate 911 under the action of grating, and finally reflected into the human eye E. In such process, the image light emitted by the light engine 913 diffuses to form a display range 910 (as FIG. 2 shows) within the field of vision of the human eye E. Specifically, the display range 910 is an area where the display module 91 can display the virtual information within the field of vision of the human eye E. Usually, the display range 910 only covers part of the field of vision of the human eye E instead of the whole field of vision, as a result, the display center point P1 of the display range 910 usually coincides with a gazing center point of the human eye E, so as to achieve a better display effect.

For the near-eye display device 900, the display module 91 can only project the virtual information to the human eye E, so as to superimpose the virtual information on the basis of the real world. However, without obtaining a real-world field of view, the image light displayed by the display module 91 cannot be correlated with the real-world field of view. In order to further realize an AR function, the virtual information should be superimposed at a proper position of the real-world field of view. Therefore, the camera module 93 is needed to synchronously obtain the view information of the human eye E, so that the display module 91 can interact with the view that the human eye E is looking at. In other words, an overlapping area between the view information obtained by the camera module 93 (that is, a shooting area 930 in FIG. 2) and the display area 910 is required, the overlapping area is an effective range F1 that can realize the AR function.

For the near-eye display device 900, the camera module 93 is configured for obtaining the view information of the human eye E, but obviously the camera module 93 cannot be set directly in front of the human eye E. Therefore, the camera module 93 is generally set above the human eye E, and an optical axis of the camera module 93 is tilted to a direction that the human eye E is looking at. An angle θ between the direction and the optical axis of the camera module 93 is usually 25°.

However, referring to FIG. 1 and FIG. 2, the near-eye display device 900 can only be applied to the state of distant view. In the state of close-up view, that is, a distance between the human eye E and an observed object is less than 40 cm, the near-eye display device 900 may not be able to realize the AR function.

Specifically, on the one hand, in the state of distant view, although an optical axis of the display module 91 coincides with the direction that the human eye E is looking at, but there is an angle θ between the optical axis of the display module 91 and the optical axis of the camera module 93, the angle θ is 25°. As a result, in the state of close-up view, the effective range F1 overlapped between the display area 910 and the shooting area 930 will become small, resulting in the failure of AR function.

On the other hand, in the state of close-up view, the gazing point of the human eye E is usually shifted downward by 15°-20° to improve the comfort of looking. That is, in the state of close-up view, the gazing center point P of the human eye E will deviate from the display center point P1 of the display module 91, causing the display area 910 of the display module 91 deviate upward from the line of sight of the human eye E, or even out of the gazing center point P of the human eye E.

Figure 3:
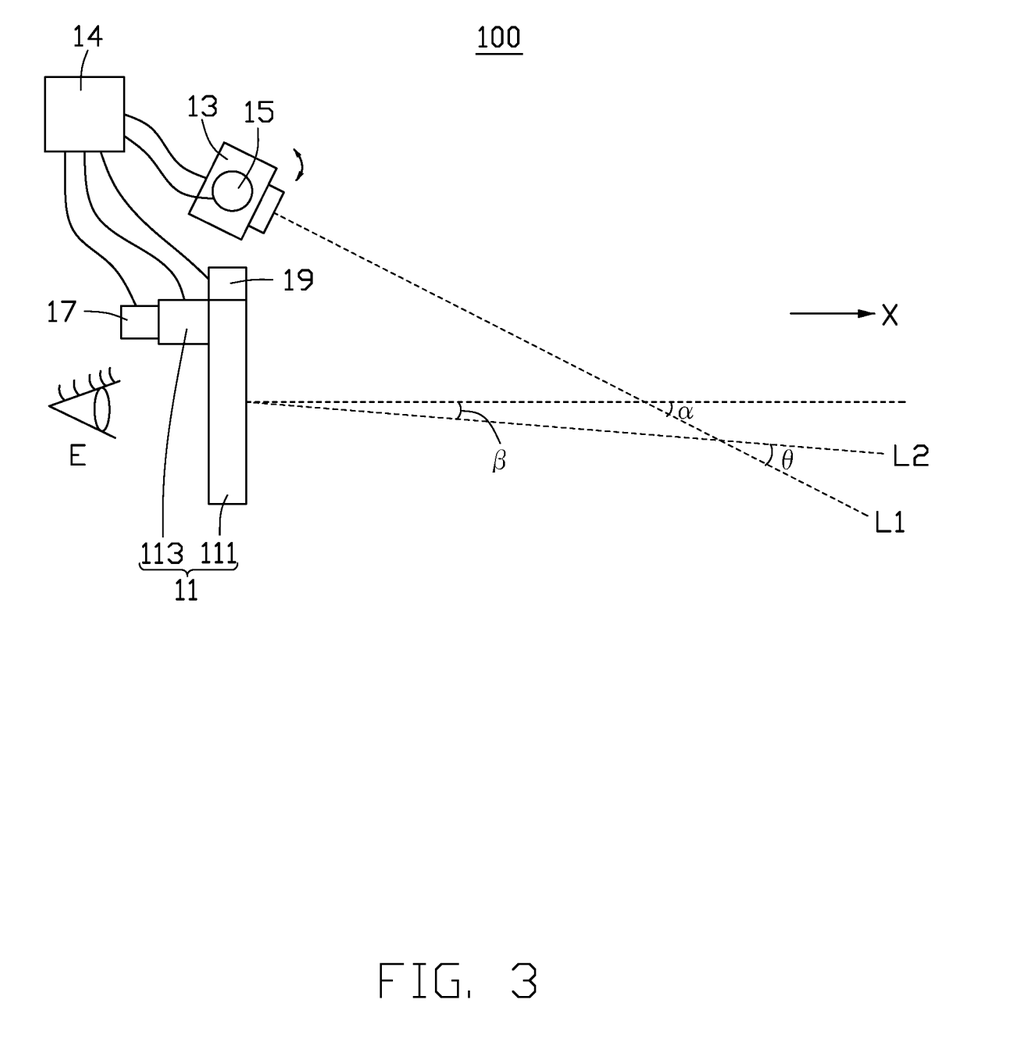
FIG. 3 is a side view of a near-eye display device according to an embodiment of the present disclosure.

In order to realize AR function in the state of close-up view, FIG. 3 illustrates a near-eye display device 100 according to an embodiment of the present disclosure. The near-eye display device 100 includes a display module 11, a camera module 13, and a rotating module 15. The camera module 13 is used to obtain an image information along a direction of a first optical axis L1. The display module 11 is used to transmit an image light of virtual information to the human eye E along a second optical axis L2. The second optical axis L2 has a non-zero included angle with the first optical axis L1. The rotating module 15 is connected with the camera module 13, and is used to control the rotation of the camera module 13 to change an included angle θ between the first optical axis L1 and the second optical axis L2, so as to switch the near-eye display device 100 between a state of close-up view and a state of distant view. In the state of distant view, the angle θ between the first optical axis L1 and the second optical axis L2 is 25°. In the state of close-up view, an angle α between the first optical axis L1 and a first direction X is 18°-25°, and the angle θ between the first optical axis L1 and the second optical axis L2 is less than or equal to 13°.

Specifically, the first direction X is a direction that the human eye E looks at in the state of distant view. In the state of close-up view, the direction that the human eye E will shift downward compared with the first direction X to improve the comfort level. In other to compensate for the shift of the direction that the human eye E looks at and the reduction of the effective area overlapped between the display area of the display module 11 and the shooting area of the camera module 13 in the state of close-up view. The rotating module 15 will control the rotation of the camera module 13 to an appropriate angle, so as to realize the AR function in the state of close-up view.

The display module 11 includes a waveguide plate 111 and a light engine 113. The light engine 113 is used to emit an image light to the waveguide plate 111, the waveguide plate 111 is used to project the image light to the human eye E, so that the human eye E can observe a virtual image from a side of the waveguide plate 111 away from the human eye E. The waveguide plate 111 is perpendicular to the second optical axis L2, and the virtual image also intersects with the second optical axis L2. The position that the second optical axis L2 intersects with a plane of the virtual image is the geometric center of the display area of the display module 11. The camera module 13 includes an image acquisition device, and the first optical axis L1 is an orientation aligned by the camera module 13, that is, the geometric center of the image information obtained by the camera module 13.

Figure 4:
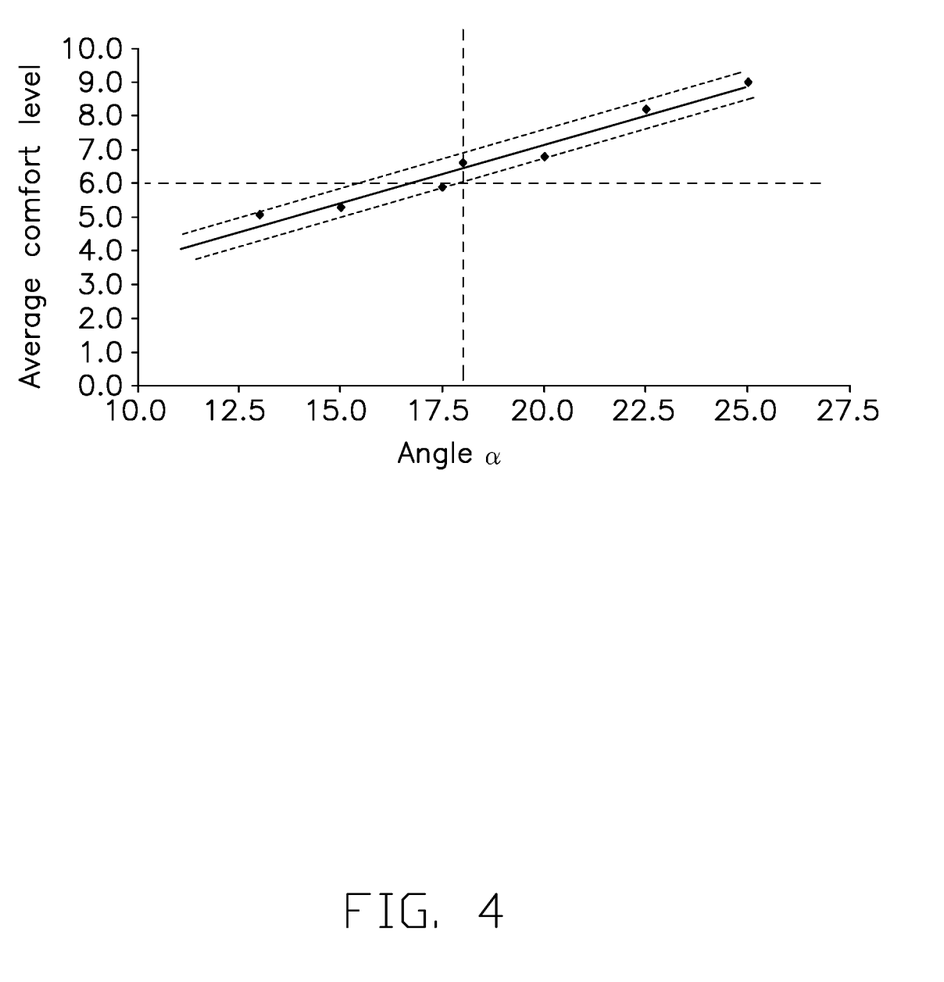
FIG. 4 is a relationship diagram between an angle of the camera module and a comfort level according to an embodiment of the present disclosure.

FIG. 4 illustrates a relationship between the angle α of the camera module 13 and a user's average comfort level in a case of the distance between the human eye E and the observed object is 40 cm. Specifically, the comfort level refers to a length of time the user can maintain a position in which the near-eye display device 100 is in use until fatigue occurs. For example, when the comfort level is 5 points, the user begins to get tired after using the near-eye display device 100 for about 5-10 minutes; when the comfort level is 6 points, the user begins to get tired after using the near-eye display device 100 for about 10-15 minutes; when the comfort level is 7 points, the user begins to get tired after using the near-eye display device 100 for about 15-20 minutes, and so on; when the comfort level is 10 points, the user begins to get tired after using the near-eye display device 100 longer than 30 minutes. Taking the 6 points average comfort level as the minimum using standard, then the angle α between the first optical axis L1 and the first direction X is 18°, and when the average comfort level is 10 points, the angle α between the first optical axis L1 and the first direction X is 25°. Therefore, in the state of close-up view, in order to ensure the comfort of use, the angle α between the first optical axis L1 and the first direction X is 18°-25°.

Figure 5:
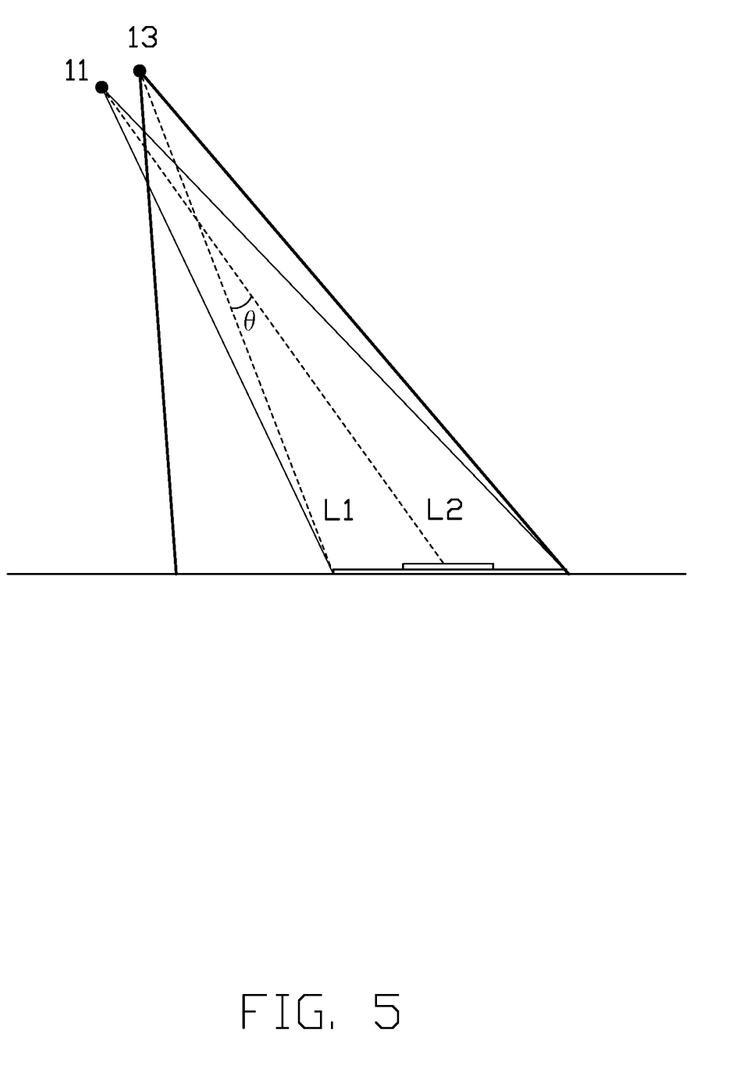
FIG. 5 is a side view of a shooting range of the camera module and a display range of the display module according to an embodiment of the present disclosure.

FIG. 5 illustrates the relationship between the display area of the display module 11 and the shooting area of the camera module 13. In the state of close-up view, when the angle θ between the first optical axis L1 of the camera module 13 and the second optical axis L2 of the display module 11 is 13°, the display area is completely covered by the shooting area, and an edge of the display area coincides with an edge of the shooting area. As a result, in order to realize the AR function, the angle θ between the first optical axis L1 and the second optical axis L2 is less than or equal to 13°. Otherwise, when the angle θ is 8°, the center of the display area of the display module 11 coincides with the center of the shooting area of the camera module 13.

Referring to FIG. 3, an angle β between the second optical axis L2 and the first direction X is Specifically, on the one hand, in the state of close-up view, the angle α is 18°-25°, and the angle θ is less than or equal to 13°, as a result, when the angle α is 18°, the angle β is at least 5°. On the other hand, since the waveguide plate 111 is perpendicular to the second optical axis L2, and the waveguide plate 111 is set in front of the human eye E, in order to prevent the waveguide plate 111 from being too inclined to touch the human eye E, the angle β between the second optical axis L2 and the first direction X is at most 12°, that is, the angle θ is actually 6°-13°.

In this embodiment, a variety of angle collocation can be included between the display module 11 and the camera module 13. For example, when the angle β between the second optical axis L2 and the first direction X is 5°, in the state of close-up view, the angle θ between the first optical axis L1 and the second optical axis L2 is 13°, and the angle α between the first optical axis L1 and the first direction X is 18°. When the angle β is 6°, in the state of close-up view, the angle θ can be 13°, and the angle α is 19°; or the angle θ can be 12°, and the angle α is 18°. When the angle β is 7°, in the state of close-up view, the angle θ can be 13°, and the angle α is 20°; or the angle θ can be 12°, and the angle α is 19°; or the angle θ can be 11°, and the angle α is 18°, etc.

The following will be illustrated in the situation when the angle β is 5°, the angle θ is 13°, and the angle α is 18°. In other embodiments, it may also be the other situations illustrated above, that is, the angle α is 18°-25°, the angle θ is 5°-12°, and the angle θ is less than or equal to 13°.

The rotating module 15 may include a rotating motor for adjusting the camera module 13 to the state of close-up view, or adjusting from the state of close-up view to the state of distant view. In the state of distant view, the angle θ between the first optical axis L1 and the second optical axis L2 is 25°.

The near-eye display device 100 also includes a processor 14, the processor 14 is electrically connected to the rotating module 15 to transmit a control signal to the rotating module 15 to control the rotation angle of the camera module 13. The processor 14 can also be electrically connected to the display module 11 and the camera module 13, so as to control the display module 11 to project the image light according to the image information obtained by the camera module 13, thus to realize the AR function.

The near-eye display device 100 can also include an eye tracking module 17 to observe the state of the human eye E, the eye tracking module 17 is electrically connected to the processor 14. The processor 14 is used to generate the control signal according to the state of the human eye E, and the rotating module 15 is used to control the camera module 13 switch between the state of distant view and the state of the close-up view according to the control signal.

Specifically, in the state of close-up view, an angle of view of the human eye E will be deflected by a certain angle from the horizontal view in the first direction X, so an eyeball of the human eye E will also deflect a certain angle. The eye tracking module 17 can obtain an image of the human eye E, and the processor 14 can judge whether the human eye E is looking at objects in the close-up view, and then control the camera module 13 to switch between the state of distant view and the state of the close-up view.

The eye tracking module 17 can include an infrared light source and a sensor. The infrared light source is used to emit infrared light toward the human eye E, and the sensor is used to sense the infrared light reflected from the human eye E to obtain the position information of the eyeball of the human eye E. Specifically, an eye surface of the human eye E includes iris and cornea, and the boundary between the iris and cornea has a certain angle. By capturing the infrared light reflected from the human eye E, the eye tracking module 17 can obtain the boundary position between the iris and cornea, so as to determine the position of the eyeball of the human eye E, and thus determine the gazing direction of the human eye E.

The near-eye display device 100 can also include a distance measuring module 19 to detect a distance between the human eye E and an observed object. The distance measuring module 19 is electrically connected to the processor 14. The processor 14 generates the control signal according to the distance, and the rotating module 15 is used to control the camera module 13 switch between the state of distant view and the state of the close-up view according to the control signal.

Specifically, the distance measuring module 19 can be a time-of-flight (ToF) ranging device, by transmitting and receiving laser light reflected from the observed object, the distance can be determined according to the round-trip time of the laser light. When the distance between the human eye E and the observed object is within a distance range of the close-up view, such as 40 cm, the rotating module 15 will switch the camera module 13 to the state of close-up view.

In other embodiments, the user can also directly control the rotating module 15 to control the switch between the state of distant view and the state of close-up view. Or the near-eye display device 100 can also include other detecting device to detect whether the near-eye display device 100 is in a situation of close-up view, then control the rotation of the camera module 13 to switch between the state of distant view and the state of the close-up view.

In this embodiment, the near-eye display device 100 can only include one of the eye tracking module 17 and the distance measuring module 19, or include both of the eye tracking module 17 and the distance measuring module 19, or include one or combination of the eye tracking module 17, the distance measuring module 19 and other detecting devices.

Figure 6:
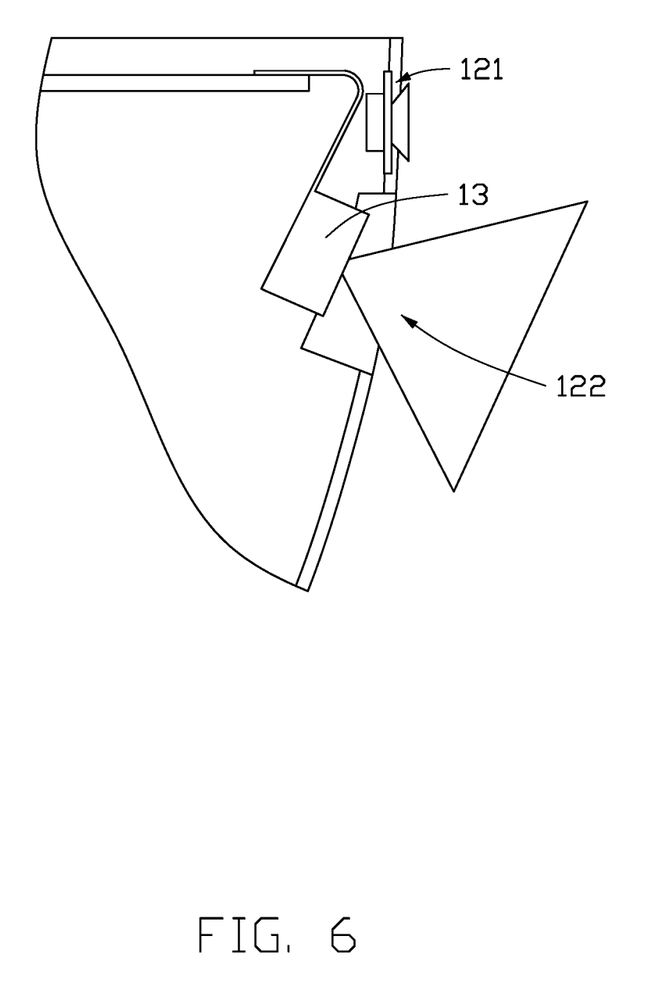
FIG. 6 is a partial side view of the camera module according to an embodiment of the present disclosure.
Figure 7:
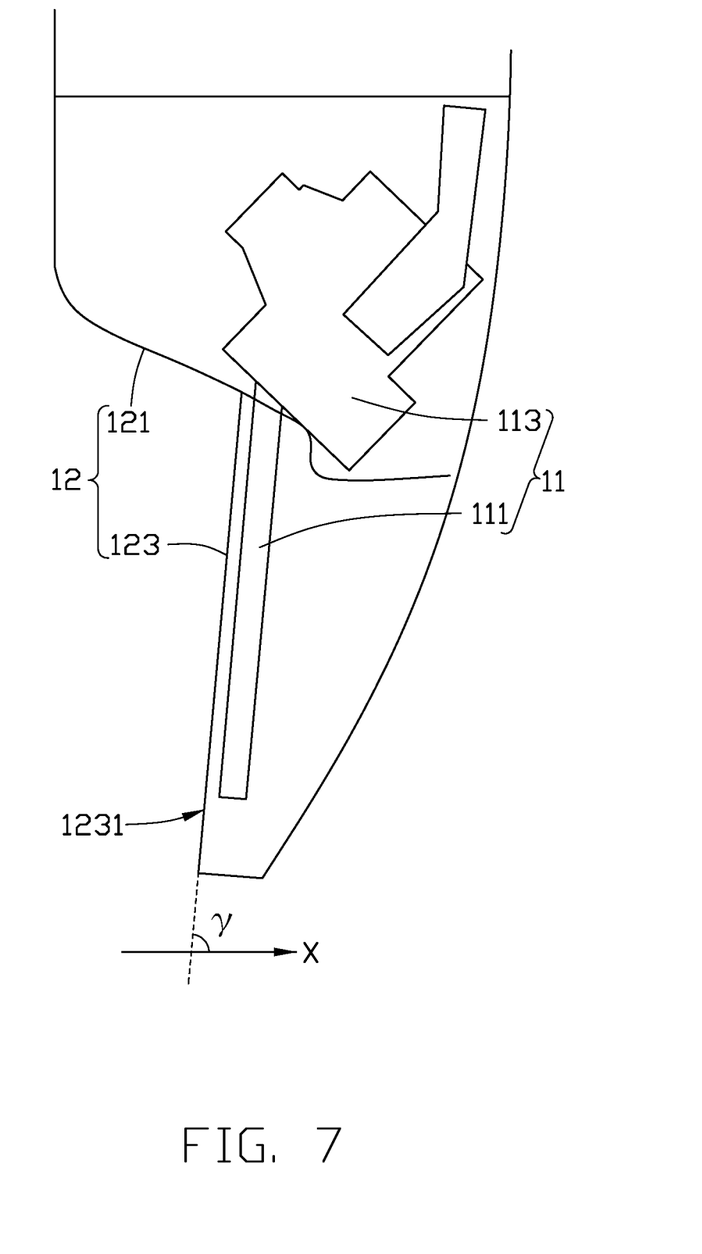
FIG. 7 is a partial side view of the display module according to an embodiment of the present disclosure.

FIG. 6 and FIG. 7 illustrate a partial side view of the near-eye display device 100 according to an embodiment of the present disclosure. The near-eye display device 100 also includes a shell 12, the shell 12 includes an upper shell 121 and a protective cover 123, the light engine 113 and the camera module 13 are set in the upper shell 121, the waveguide plate 111 is covered by the protective cover 123, and an end of the protective cover 123 away from the upper shell 121 tilts in a direction of the human eye E, so that an angle γ between a wall 1231 of the protective cover 123 facing the human eye E and the first direction X is 78°-85°.

Specifically, the upper shell 121 is used to protect the light engine 113 and the camera module 13, the protective cover 123 is used to protect the waveguide plate 111, that is, the protective cover 123 is set parallel to the waveguide plate 111. The upper shell 121 can be made of an opaque material, and the protective cover 123 is made of a transparent material. A hole 122 can be defined in the upper shell 121 corresponding to the camera module 13 to facilitate image acquisition.

By setting the rotating module 15, the camera module 13 can switch between the state of distant view and the state of close-up view, so that the near-eye display device 100 can be applied to the situations of distant view and close-up view. By setting the angle α between the first optical axis L1 of the camera module 13 and the first direction X is 18°-25°, the comfort level of the user can be improved. By setting the angle θ between the first optical axis L1 of the camera module 13 and the second optical axis L2 of the display module 11 is less than or equal to 13°, the display area of the display module 11 can be completely covered by the shooting area of the camera module 13, so that the AR function can be realized within the display area. By setting the eye tracking module 17 and the distance measuring module 19, the situation of the near-eye display device 100 can be judged, so as to control the camera module 13 to switch between the state of distant view and the state of close-up view, thus expanding the use range of the near-eye display device 100.

Figure 8:
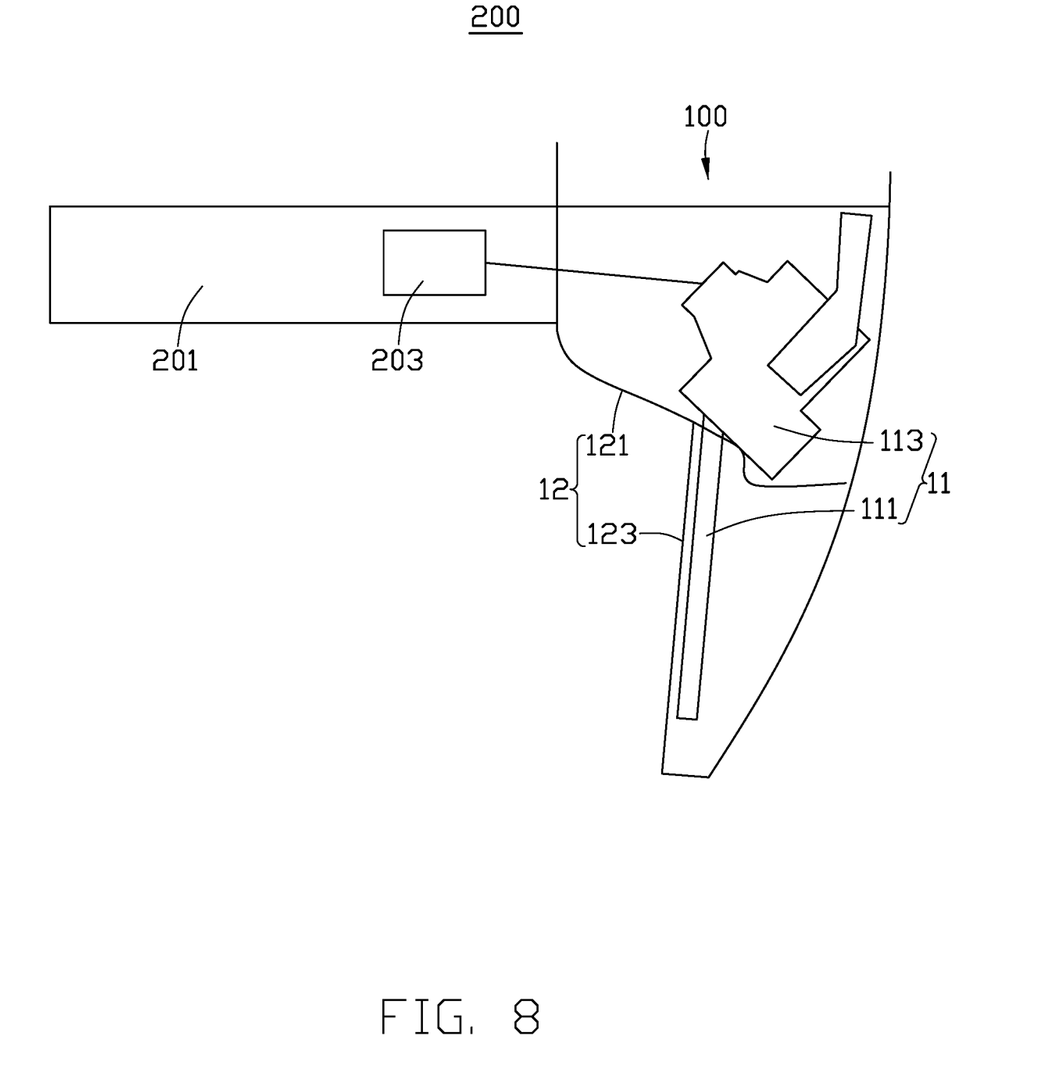
FIG. 8 is a top view of an AR device according to an embodiment of the present disclosure.

FIG. 8 illustrates an AR device 200 according to an embodiment of the present disclosure. The AR device 200 includes the near-eye display device 100 and a fixing device 201. The fixing device 201 is used to fix the near-eye display device 100 to a user's head so that the human eye is aligned with the display module 11.

In this embodiment, the fixing device 201 is connected to the shell 12. Specifically, the fixing device 201 is connected to the upper shell 121. The fixing device 201 can be a belt used to fix the near-eye display device 100 to the user's head. In other embodiments, the fixing device 201 can also be a pair of legs to support the near-eye display device 100 in front of the human eye like a pair of glasses.

In this embodiment, the AR device 200 also includes a battery 203, the battery 203 is electrically connected to the near-eye display device 100 to provide power to the near-eye display device 100. The battery 203 can be set on the fixing device 201 to balance the weight of the AR device 200, or can be set independently and wired to the near-eye display device 100.

Figure 9:
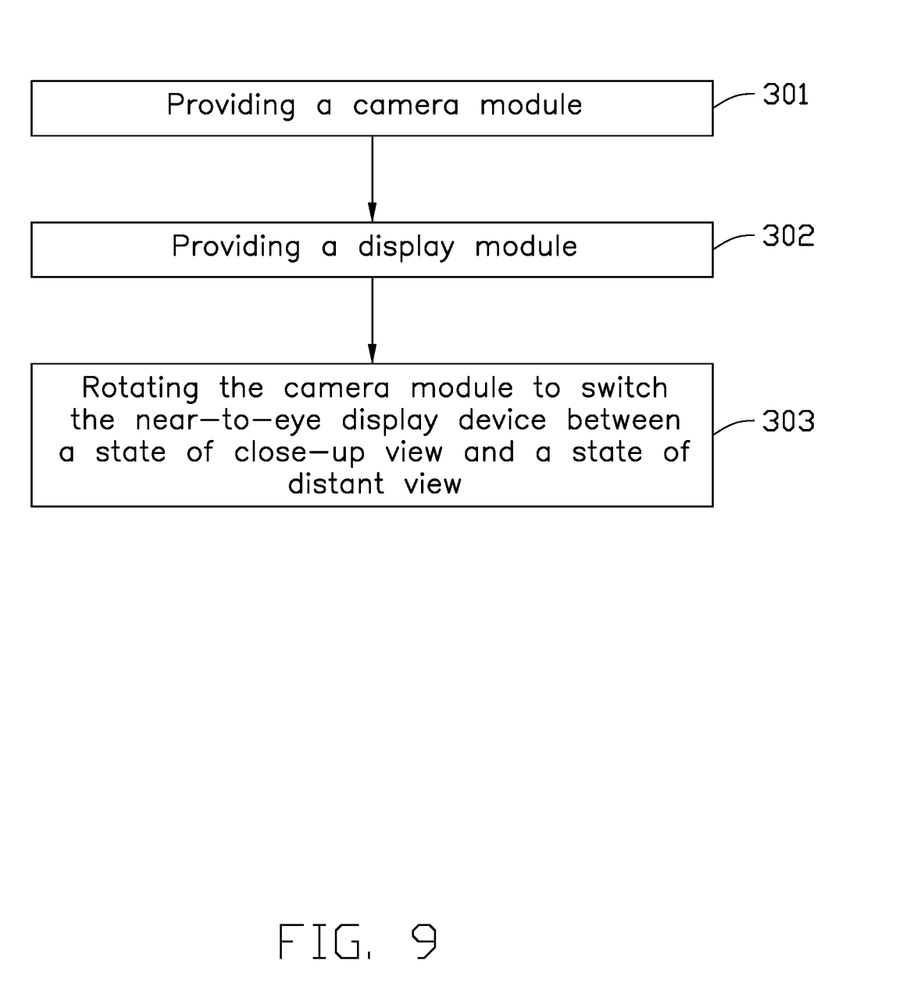
FIG. 9 is a flowchart of a viewing angle adjustment method of the near-eye display device according to an embodiment of the present disclosure.

Referring to FIG. 9, a flowchart is presented in accordance with an example embodiment which is thus illustrated. The example method is provided by way of example, as there are a variety of ways to carry out the method. The method described below can be carried out using the configurations illustrated in FIGS. 3, for example, and various elements of these figures are referenced in explaining example method. Each block shown in FIG. 9 represents one or more processes, methods, or subroutines, carried out in the exemplary method. Additionally, the illustrated order of blocks is by example only and the order of the blocks can change according to the present disclosure. The exemplary method can begin at block 301.

At block 301, a camera module 13 is provided, the camera module 13 is used to obtain an image information along a direction of a first optical axis L1.

At block 302, a display module 11 is provided, the display module 11 is used to transmit an image light of virtual information to a human eye E along a second optical axis L2.

At block 303, the camera module 13 can be rotated to switch between a state of close-up view and a state of distant view. In the state of close-up view, an angle α between the first optical axis L1 and a first direction X is 18°-25°, and the angle θ between the first optical axis L1 and the second optical axis L2 is less than or equal to 13°.

Before the block 303, the camera module 13 can be rotated to the state of distant view. In the state of distant view, the angle θ between the first optical axis L1 and the second optical axis L2 is Specifically, in the state of distant view, the angle θ should be set to 25° to ensure that the AR function can be realized in the state of distant view.

Before the block 303, a movement state of the human eye E can be tracked, so as to rotate the camera module 13 to either the state of close-up view or the state of distant view according to the movement state of the human eye E. Specifically, the human eye E will deflect downward 15°-20° in the situation of close-up view, by tracking the movement state of the human eye E, the current situation can be determined as close-up view situation when the human eye E is deflected downward, so as to control the rotation of the camera module 13 from the state of distant view to the state of close-up view.

Before the block 303, a distance between the human eye E and an observed object can be measured, so as to rotate the camera module 13 to either the state of close-up view or the state of distant view according to the distance. Specifically, in the state of close-up view, the distance between the human eye E and the observed object will be less than a certain value, such as less than By measuring the distance, it can be determined whether the current situation is a close-up view situation, so as to determine whether to control the rotation of the camera module 13 from the state of distant view to the state of close-up view.

In this embodiment, both of the movement state and the distance can be obtained by the near-eye display device 100, or only one method of obtaining the movement state and obtaining the distance is used to judge the situation of the near-eye display device 100, and then determine the rotation of the camera module 13. In other embodiments, other detecting method can also be used to detect the situation of the near-eye display device 100.

By rotating the camera module 13 to switch between the state of distant view and the state of close-up view, the near-eye display device 100 can be applied to both situation of the distant view and the close-up view, thus expanding the use range of the near-eye display device 100.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A near-eye display device, comprising:
   a camera module configured for obtaining an image information along a direction of a first optical axis;

a display module configured for transmitting an image light of virtual information to a human eye along a second optical axis; and a rotating module connected with the camera module, wherein the rotating module is configured for controlling a rotation of the camera module to change a position of the first optical axis, so as to switch the near-eye display device between a state of close-up view and a state of distant view, in the state of distant view, an included angle between the first optical axis and the second optical axis is 25°, and in the state of close-up view, the included angle is less than or equal to 13°.

2. The near-eye display device of claim 1, wherein an angle between the first optical axis and a first direction is 18°-25° in the state of close-up view, and the first direction is a direction of a head-up view of the human eye in the state of distant view.

3. The near-eye display device of claim 2, wherein the display module comprises a light engine and a waveguide plate, the light engine is configured for emitting an image light, the waveguide plate is configured for transmitting the image light to the human eye, and the waveguide plate is substantially perpendicular to the second optical axis.

4. The near-eye display device of claim 3, further comprising a shell, the shell comprising an upper shell and a protective cover; wherein the light engine and the camera module are in the upper shell, the protective cover covers the waveguide plate, and an end of the protective cover away from the upper shell tilts in a direction of the human eye, so that an angle between a wall of the protective cover facing the human eye and the first direction is 78°-85°.

5. The near-eye display device of claim 1, further comprising a processor, wherein the processor is electrically connected to the rotating module, and is configured for transmitting a control signal to the rotating module to control a rotation angle of the camera module.

6. The near-eye display device of claim 5, further comprising an eye tracking module configured for determining a state of the human eye; wherein the eye tracking module is electrically connected to the processor, the processor is configured for generating the control signal according to the state of the human eye, and the rotating module is configured for controlling the camera module switch between the state of distant view and the state of close-up view according to the control signal.

7. The near-eye display device of claim 5, further comprising a distance measuring module configured for detecting a distance between the human eye and an observed object; wherein the distance measuring module is electrically connected to the processor, the processor is configured for generating the control signal according to the distance, and the rotating module is configured for controlling the camera module switch between the state of distant view and the state of close-up view according to the control signal.

8. An augmented reality (AR) device, comprising:
a near-eye display device, comprising:
a camera module configured for obtaining an image information along a direction of a first optical axis;
a display module configured for transmitting an image light of virtual information to a human eye along a second optical axis; and
a rotating module connected with the camera module, the rotating module is configured for controlling a rotation of the camera module to change a position of the first optical axis, so as to switch the near-eye display device between a state of close-up view and a state of distant view; and
a fixing device configured for fixing the near-eye display device to a user's head so that the human eye is aligned with the display module,
wherein, in the state of distant view, an angle between the first optical axis and the second optical axis is 25°, and in the state of close-up view, the angle between the first optical axis and the second optical axis is less than or equal to 13°.

9. The AR device of claim 8, wherein an angle between the first optical axis and a first direction is 18°-25° in the state of close-up view, and the first direction is a direction of a head-up view of the human eye in the state of distant view.

10. The AR device of claim 9, wherein the display module comprises a light engine and a waveguide plate, the light engine is configured for emitting an image light, the waveguide plate is configured for transmitting the image light to the human eye, and the waveguide plate is perpendicular to the second optical axis.

11. The AR device of claim 10, wherein the near-eye display device further comprises a shell, the shell comprises an upper shell and a protective cover; the light engine and the camera module are in the upper shell, the protective cover covers the waveguide plate, and an end of the protective cover away from the upper shell tilts in a direction of the human eye, so that an angle between a wall of the protective cover facing the human eye and the first direction is 78°-85°.

12. The AR device of claim 11, wherein the fixing device is connected to the shell.

13. The AR device of claim 8, further comprising a battery, wherein the battery is electrically connected to the near-eye display device.

14. The AR device of claim 8, wherein the near-eye display device further comprises a processor, wherein the processor is electrically connected to the rotating module, and is configured for transmitting a control signal to the rotating module to control the rotation angle of the camera module.

15. The AR device of claim 14, wherein the near-eye display device further comprises an eye tracking module configured for determining a state of the human eye; wherein the eye tracking module is electrically connected to the processor, the processor is configured for generating the control signal according to the state of the human eye, the rotating module is configured for controlling the camera module switch between the state of distant view and the state of close-up view according to the control signal.

16. The AR device of claim 14, wherein the near-eye display device further comprises a distance measuring module configured for detecting a distance between the human eye and an observed object; wherein the distance measuring module is electrically connected to the processor, the processor is configured for generating the control signal according to the distance, the rotating module is configured for controlling the camera module switch between the state of distant view and the state of close-up view according to the control signal.

17. A viewing angle adjustment method of a near-eye display device, comprising:
providing a camera module, which is configured for obtaining an image information along a direction of a first optical axis;
providing a display module, which is configured for transmitting an image light of virtual information to a human eye along a second optical axis;

rotating the camera module to switch the near-eye display device between a state of close-up view and a state of distant view, wherein, in the state of distant view, an angle between the first optical axis and the second optical axis is 25°, and in the state of close-up view, the angle between the first optical axis and the second optical axis is less than or equal to 13°.

18. The method of claim 17, wherein rotating the camera module to switch the near-eye display device between the state of close-up view and the state of distant view further comprises: rotating the camera module to the state of close-up view, wherein an angle between the first optical axis and a first direction is 18°-25° in the state of close-up view, wherein the first direction is a direction that the human eye looks at in the state of distant view.

19. The method of claim 17, further comprising: tracking a movement state of the human eye; and rotating the camera module to either the state of close-up view or the state of distant view according to the movement state of the human eye.

20. The method of claim 17, further comprising: measuring a distance between the human eye and an observed object; and rotating the camera module to either the state of close-up view or the state of distant view according to the distance.

* * * * *